United States Patent
Jain et al.

(10) Patent No.: US 11,821,210 B1
(45) Date of Patent: Nov. 21, 2023

(54) PEEL-AND-STICK ROOFING MEMBRANES AND METHODS FOR FORMING FULLY-ADHERED ROOFING SYSTEMS

(71) Applicant: Holcim Technology Ltd, Zug (CH)

(72) Inventors: Dharamdeep Jain, Nashville, TN (US); Jiansheng Tang, Westfield, IN (US); Michael J. Hubbard, Goshen, IN (US)

(73) Assignee: Holcim Technology Ltd, Zug (CH)

( * ) Notice: Subject to any disclaimer, the term of this patent is extended or adjusted under 35 U.S.C. 154(b) by 15 days.

(21) Appl. No.: 17/476,235

(22) Filed: Sep. 15, 2021

Related U.S. Application Data (60) Provisional application No. 63/078,519, filed on Sep. 15, 2020.

(51) Int. Cl.
*E04D 5/14* (2006.01)
*E04D 5/06* (2006.01)
(Continued)

(52) U.S. Cl.
CPC .............. *E04D 5/148* (2013.01); *C09J 7/241* (2018.01); *C09J 7/385* (2018.01); *C09J 7/40* (2018.01);
(Continued)

(58) Field of Classification Search
CPC .................................. E04D 5/06; E04D 5/148
See application file for complete search history.

(56) References Cited

U.S. PATENT DOCUMENTS

| | | |
|---|---|---|
| 4,849,268 A | 7/1989 | Backenstow et al. |
| 5,322,581 A * | 6/1994 | Heerten .................. E04D 5/142 28/107 |

(Continued)

FOREIGN PATENT DOCUMENTS

| | | | |
|---|---|---|---|
| WO | WO-2004015216 A1 * | 2/2004 | ............ D06N 5/006 |
| WO | 2017165868 | 9/2017 | |

*Primary Examiner* — Christine T Cajilig
(74) *Attorney, Agent, or Firm* — Renner, Kenner; Arthur M. Reginelli (57) ABSTRACT

A method of installing a roof system, the method comprising (i) providing a first membrane composite including a polymeric planar body having first and second planar surfaces, a UV-cured pressure-sensitive adhesive layer disposed on the second planar surface, a release member removably secured to the pressure-sensitive adhesive layer opposite the planar body; and a primer layer disposed along a lap area on the first planar surface; (ii) adhesively securing the first membrane composite to a roof surface through the UV-cured pressure-sensitive adhesive layer; (iii) providing a second membrane composite including a polymeric planar body having first and second planar surfaces, a UV-cured pressure-sensitive adhesive layer disposed on the second planar surface, a release member removably secured to the pressure-sensitive adhesive layer opposite the planar body; and optionally including a primer layer disposed along a lap area on the first planar surface; (iv) adhesively securing the second membrane composite to the roof surface through the UV-cured pressure-sensitive adhesive layer, where the second membrane composite is positioned adjacent to and partially overlapping the lap area of the first membrane composite; and (v) adhesively securing the second membrane composite to the first planar surface of the first membrane composite along the primer layer through the UV-cured pressure-sensitive adhesive layer disposed on the second membrane composite.

9 Claims, 2 Drawing Sheets

(51) Int. Cl.
  *C09J 7/50* (2018.01)
  *C09J 7/40* (2018.01)
  *C09J 7/38* (2018.01)
  *C09J 7/24* (2018.01)
  *C09J 133/08* (2006.01)
  *B32B 37/12* (2006.01)
  *B29C 65/48* (2006.01)

(52) U.S. Cl.
  CPC ............... *C09J 7/50* (2018.01); *C09J 133/08* (2013.01); *E04D 5/06* (2013.01); *B29C 65/4845* (2013.01); *B32B 2037/1253* (2013.01); *B32B 2419/06* (2013.01); *C09J 2301/302* (2020.08); *C09J 2301/416* (2020.08); *C09J 2433/003* (2013.01)

(56) References Cited

U.S. PATENT DOCUMENTS

| | | | |
|---|---|---|---|
| 7,317,051 B2 | 1/2008 | Georgeau et al. | |
| 7,368,155 B2* | 5/2008 | Larson | E04D 5/142 |
| | | | 428/141 |
| 7,767,308 B2 | 8/2010 | Georgeau et al. | |
| 7,772,301 B2 | 8/2010 | Fensel et al. | |
| 8,435,639 B2 | 5/2013 | Rokowski et al. | |
| 8,512,508 B2 | 8/2013 | Fensel et al. | |
| 8,993,667 B2 | 3/2015 | Rokowski et al. | |
| 9,115,493 B2 | 8/2015 | Rokowski et al. | |
| 9,217,060 B2 | 12/2015 | Ando | |
| 2003/0124292 A1* | 7/2003 | Unterreiter | E04D 5/12 |
| | | | 428/40.1 |
| 2004/0154265 A1* | 8/2004 | Knowlton | E04B 1/66 |
| | | | 52/741.1 |
| 2005/0107499 A1 | 5/2005 | Georgeau et al. | |
| 2005/0235591 A1* | 10/2005 | Martin | E04D 5/142 |
| | | | 52/409 |
| 2006/0127627 A1* | 6/2006 | Larson | E04D 5/142 |
| | | | 156/289 |
| 2007/0264471 A1* | 11/2007 | Kalwara | B29C 65/5021 |
| | | | 427/407.1 |
| 2008/0237537 A1 | 10/2008 | Huang et al. | |
| 2010/0003443 A1* | 1/2010 | Kalwara | B32B 7/06 |
| | | | 428/480 |
| 2010/0024955 A1 | 2/2010 | Kalwara et al. | |
| 2010/0200148 A1* | 8/2010 | Douglas | E04B 1/665 |
| | | | 427/508 |
| 2011/0198023 A1* | 8/2011 | Tippins | E04D 5/12 |
| | | | 156/227 |
| 2013/0316157 A1* | 11/2013 | Yang | E04D 5/148 |
| | | | 156/60 |
| 2016/0230392 A1* | 8/2016 | Tang | B32B 7/12 |
| 2017/0015083 A1* | 1/2017 | Tang | B32B 25/04 |
| 2020/0299965 A1* | 9/2020 | Tang | C09J 7/385 |

\* cited by examiner

PEEL-AND-STICK ROOFING MEMBRANES AND METHODS FOR FORMING FULLY-ADHERED ROOFING SYSTEMS

This application claims the benefit of U.S. Provisional Application Ser. No. 63/078,519 filed on Sep. 15, 2020, which is incorporated herein by reference.

FIELD OF THE INVENTION

Embodiments of the invention are directed toward roofing membrane panels including a cured pressure-sensitive adhesive on a planar surface of the panel and a primer applied along a lap seam on the opposite planar surface of the panel.

BACKGROUND OF THE INVENTION

Large, flexible polymeric sheets, which are often referred to as membranes or panels, are used in the construction industry to cover flat or low-sloped roofs. These membranes provide protection to the roof from the environment, particularly in the form of a waterproof barrier. As is known in the art, commercially popular membranes include thermoset membranes such as those including cured EPDM (i.e., ethylene-propylene-diene terpolymer rubber) or thermoplastics such as TPO (i.e., thermoplastic olefins).

These membranes are typically delivered to a construction site in a bundled roll, transferred to the roof, and then unrolled and positioned. The sheets are then affixed to the building structure by employing varying techniques such as mechanical fastening, ballasting, and/or adhesively adhering the membrane to the roof. The roof substrate to which the membrane is secured may be one of a variety of materials depending on the installation site and structural concerns. For example, the surface may be a concrete, metal, or a wood deck, it may include insulation or recover board, and/or it may include an existing membrane.

In addition to securing the membrane to the roof, the individual membrane panels, together with flashing and other accessories, are positioned and adjoined (i.e. seamed) together so as to achieve a waterproof barrier on the roof. Typically, the edges of adjoining panels are overlapped, and these overlapping portions are adjoined (i.e. seamed) to one another through a number of methods depending upon the membrane materials and exterior conditions. One approach involves providing adhesives or adhesive tapes between the overlapping portions, thereby creating a water resistant seal.

WO 2017/165868A1 describes a method for forming a fully-adhered roofing system by using peel-and-stick techniques whereby a cured pressure-sensitive adhesive that is disposed on a roofing membrane is capable of securing the membrane to roof surface and is also capable of mating the membrane to an adjacent membrane and thereby form a lap seam. The surface of the adjacent membrane to which the pressure-sensitive adhesive is applied in forming the lap seam can be primed.

Field priming of the membrane panels in the lap area is performed by roofing mechanics, and therefore there is a risk of improper application. For example, roof mechanics may not apply enough primer or apply it unevenly. Also, the primer compositions that are used include solvents that must flash prior to forming the seam. If seaming takes place too quickly, an inadequate seam can be formed. Also, the evaporation of the solvents produces VOCs, which can be regulated or prohibited.

It is also known to pre-prime membranes so that the membranes do not have to be field primed. For example, U.S. Publ. No. 2007/0264471 teaches a factory applied non-tacky primer composition to a roof membrane for bonding to an adhesive without the need for field-applied primer. Since the primer is non-tacky, the membrane can be rolled onto itself without adhering to an uncoated surface. U.S. Publ. No. 2010/0024955 similarly teaches a pre-primed membrane where the primer layer carries a release liner. U.S. Publ. No. 2010/0200148 teaches roofing membranes with a layer of cured polymer coating layer in the lap area. The cured polymer coating layer is non-tacky and therefore does not require a release liner. The disclosed coatings include UV-cured acrylic compositions and moisture-cured one-part urethane compositions.

SUMMARY OF THE INVENTION

One or more embodiments of the present invention provide a method of installing a roof system, the method comprising (i) providing a first membrane composite including a polymeric planar body having first and second planar surfaces, a UV-cured pressure-sensitive adhesive layer disposed on the second planar surface, a release member removably secured to the pressure-sensitive adhesive layer opposite the planar body; and a primer layer disposed along a lap area on the first planar surface; (ii) adhesively securing the first membrane composite to a roof surface through the UV-cured pressure-sensitive adhesive layer; (iii) providing a second membrane composite including a polymeric planar body having first and second planar surfaces, a UV-cured pressure-sensitive adhesive layer disposed on the second planar surface, a release member removably secured to the pressure-sensitive adhesive layer opposite the planar body; and optionally including a primer layer disposed along a lap area on the first planar surface; (iv) adhesively securing the second membrane composite to the roof surface through the UV-cured pressure-sensitive adhesive layer, where the second membrane composite is positioned adjacent to and partially overlapping the lap area of the first membrane composite; and (v) adhesively securing the second membrane composite to the first planar surface of the first membrane composite along the primer layer through the UV-cured pressure-sensitive adhesive layer disposed on the second membrane composite.

Yet other embodiments of the present invention provide a membrane composite comprising (i) a polymeric membrane panel having a first planar surface and a second planar surface; (ii) a pressure-sensitive adhesive layer disposed on said second planar surface; (iii) a release member removably secured to said pressure-sensitive adhesive layer; and (iv) a primer layer applied along a lap area on said second planar surface.

Still yet other embodiments of the present invention provide a process for forming a membrane composite, the process comprising (i) heating a melt-extrudable, UV-curable pressure-sensitive adhesive to allow the adhesive to flow; (ii) applying the adhesive to a second planar surface of a membrane panel to form a coating of adhesive; (iii) subjecting the coating of the adhesive to UV radiation to thereby effect crosslinking of the adhesive; (iv) applying a release member to the adhesive coating; (v) applying a primer composition along a lap area of a first planar surface of the membrane panel; (vi) allowing the primer composition to dry to form a pre-applied primer layer to form a composite; and (vii) winding the composite.

DETAILED DESCRIPTION OF ILLUSTRATIVE EMBODIMENTS

Embodiments of the invention are based, at least in part, on the discovery of a method for efficiently installing a fully-adhered roofing membrane system. The methods of the invention employ a membrane composite that includes a cured pressure-sensitive adhesive disposed on a planar surface of the membrane panel and a layer of primer disposed on the opposite planar surface of the membrane panel. The pressure-sensitive adhesive serves to adhere the membrane panel to the roof substrate and to seam the membrane to adjacent membranes at the location of a complementary primer layer. Advantageously, both the pressure-sensitive adhesive and the primer layer are applied to the membrane at a fabrication facility, and therefore the membranes can be installed on a roof by using peel-and-stick techniques without the need for applying adhesives or primers during installation. The ability to install the membranes according these techniques not only provides an efficient installation method, but it also provides a method whereby the VOCs released to the environment during installation are substantially reduced or eliminated.

Membrane Panel Construction

As suggested above, the membrane composite panels employed in the practice of the present invention include a polymeric membrane, a pressure-sensitive adhesive layer, and a primer layer. An example of a membrane composite panel can be described with reference to FIG. 1, which shows a membrane composite panel 11, which may be referred to as a membrane composite 11 or composite panel 11. Membrane composite 11 includes polymeric membrane panel 13 having a first planar surface 15 and a second planar surface 17. A pressure-sensitive adhesive layer 19 is disposed on and adhesively mated to planar surface 17. In one or more embodiments, pressure-sensitive adhesive layer 19 is disposed on all or substantially all of surface 17. An optional release member 21 may be removably attached to layer 19 on surface 22 of layer 19, which surface is opposite to where adhesive layer 19 contacts planar surface 17 of panel 13. A primer layer 23 is disposed on and adhesively mated to planar surface 15 of panel 13. In one or more embodiments, primer layer 23 is disposed on only a portion of surface 15. For example, in one or more embodiments, primer layer 23 is disposed on a lap portion 25, which may also be referred to a lap area 25, on first planar surface 15. An optional release member 27 may be removably attached to layer 23 on surface 28 of primer layer 23, which surface is opposite to where primer layer 23 contacts planar surface 15 of panel 13.

Figure 1:
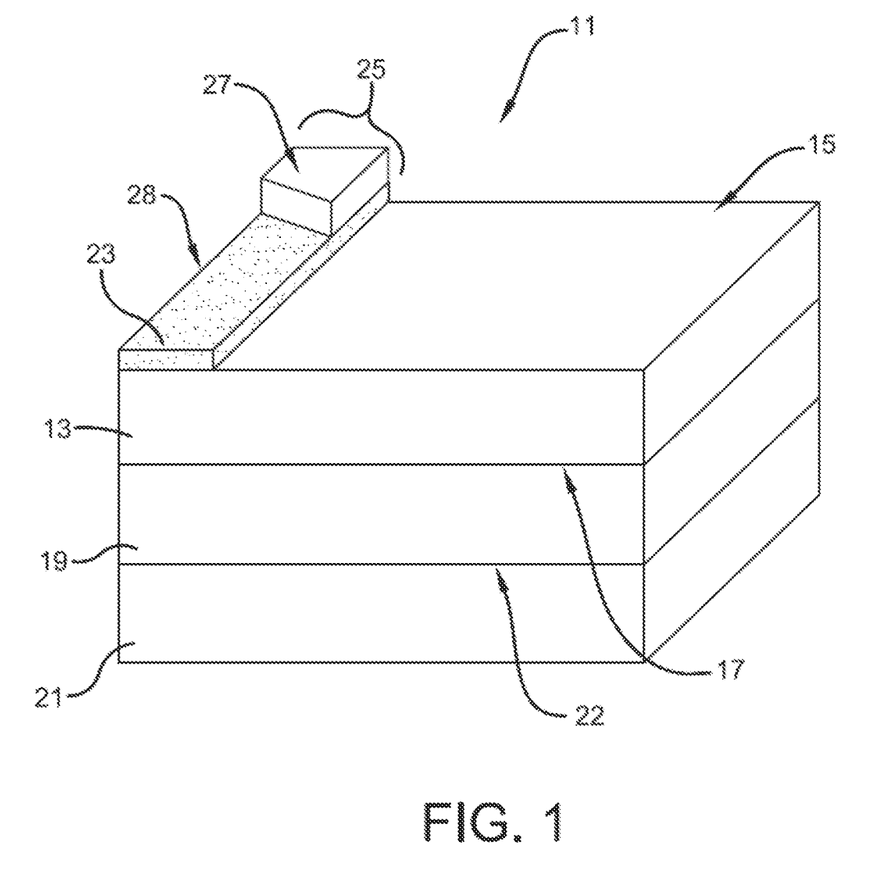
FIG. 1 is a cross-section perspective view of a membrane composite according to embodiments of the present invention.

As indicated above, pressure-sensitive adhesive layer 19 may be disposed on all or substantially all of surface 17 of panel 13. In one or more embodiments, pressure-sensitive adhesive layer 19 is disposed over greater than 80%, in other embodiments greater 90%, and in other embodiments greater than 99% of the surface area of surface 17 of panel 13.

As also indicated above, primer layer 23 may be disposed only in lap area 25 of surface 15 of panel 13. In one or more embodiments, lap area 25, and therefore primer layer 23, includes or occupies less than 20%, in other embodiments less than 10%, and in other embodiments less than 5% of the surface area of surface 15 of panel 13. In these or other embodiments, lap area 25 extends along the lateral edge of panel 13 (i.e. extends along a longitudinal length of panel 13) and extends inwardly from the edge (i.e. perpendicular to the edge) greater than 1 cm, in other embodiments greater than 2 cm, and in other embodiments greater than 3 cm. In these or other embodiments, the lap area 25 extends along the lateral edge of panel 13 and extends inwardly from the edge less than 30 cm, in other embodiments less than 20 cm, and in other embodiments less than 15 cm. In one or more embodiments, the lap area 25 extends along the lateral edge of panel 13 and extends inwardly from the edge a distance of from about 1 to about 30, in other embodiments from about 2 to about 20, and in other embodiments from about 3 to about 15 cm.

In one or more embodiments, the pressure-sensitive adhesive layer (e.g. layer 19) may have a thickness of greater than 51 μm (2 mil), in other embodiments greater than 102 μm (4 mil), in other embodiments greater than 127 μm (5 mil), and in other embodiments greater than 152 μm (6 mil). In these or other embodiments, the pressure-sensitive adhesive layer has a thickness of less than 381 μm (15 mil), in other embodiments less than 305 μm (12 mil), and in other embodiments less than 254 μm (10 mil). In one or more embodiments, the adhesive layer has a thickness of from about 51 to about 381 μm (about 2 to about 15 mil), in other embodiments from about 102 to about 305 μm (about 4 to about 12 mil), and in other embodiments from about 127 to about 254 μm (about 5 to about 10 mil).

In one or more embodiments, the primer layer (e.g. layer 23) may have a thickness of greater than 6 μm (0.25 mil), 12 μm (0.5 mil), 25 μm (1 mil), in other embodiments greater than 38 μm (1.5 mil), in other embodiments greater than 51 μm (2 mil), and in other embodiments greater than 64 μm (2.5 mil). In these or other embodiments, the primer layer has a thickness of less than 178 μm (7 mil), in other embodiments less than 127 μm (5 mil), and in other embodiments less than 76 μm (3 mil). In one or more embodiments, the adhesive layer has a thickness of from about 6 to about 178 μm (about 0.25 to about 7 mil), in other embodiments from about 25 to about 127 μm (about 1 to about 5 mil), and in other embodiments from about 51 to about 76 μm (about 2 to about 3 mil).

Membrane Panel

In one or more embodiments, the membrane panel (e.g. panel 13) may be a thermoset material. In other embodiments the membrane may be a thermoformable material. In one or more embodiments, the membrane may be EPDM based. In other embodiments, the membrane may be TPO based. In these or other embodiments, the membrane may be flexible and capable of being rolled up for shipment. In these or other embodiments, the membrane may include fiber reinforcement, such as a scrim. In one or more embodiments, the membrane includes EPDM membranes including those that meet the specifications of the ASTM D-4637. In other embodiments, the membrane includes thermoplastic membranes including those that meet the specifications of ASTM D-6878-03. Still other membranes may include PVC, TPV, CSPE, and asphalt-based membranes.

In one or more embodiments, conventional dimensions characterize the roofing membrane panels. For example, in one or more embodiments, the membrane panels may have a thickness of from about 500 μm to about 3 mm, in other embodiments from about 1,000 μm to about 2.5 mm, and in other embodiments from about 1,500 μm to about 2 mm. In these or other embodiments, the membrane panels of the present invention are characterized by a width of about 1 m to about 20 m, in other embodiments from about 2 m to about 18 m, and in other embodiments from about 3 m to about 15 m.

Pressure-Sensitive Adhesive Layer

In one or more embodiments, the pressure-sensitive adhesive (e.g., layer 19) derives from a curable hot-melt adhesive composition. In other words, and as will be described in greater detail below, an uncured adhesive composition is applied to a surface of the membrane as a hot-melt composition (i.e., the composition is heated and applied as a flowable composition in the absence or appreciable absence of solvent), and then the composition is subsequently crosslinked (i.e., cured) to form the cured pressure-sensitive layer.

In one or more embodiment, the curable hot-melt adhesive composition may be an acrylic-based hot-melt adhesive. In one or more embodiments, the adhesive includes a polyacrylate such as a polyacrylate elastomer. In one or more embodiments, useful polyacrylates include one or more units defined by the formula:

where each $R^1$ is individually hydrogen or a hydrocarbyl group and each $R^2$ is individually a hydrocarbyl group. In the case of a homopolymer, each $R^1$ and $R^2$, respectively, throughout the polymer are same in each unit. In the case of a copolymer, at least two different $R^1$ and/or two different $R^2$ are present in the polymer chain.

In one or more embodiments, hydrocarbyl groups include, for example, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may contain heteroatoms including, but not limited to, nitrogen, oxygen, boron, silicon, sulfur, and phosphorus atoms. In particular embodiments, each $R^2$ is an alkyl group having at least 4 carbon atoms. In particular embodiments, $R^1$ is hydrogen and $R^2$ is selected from the group consisting of butyl, 2-ethylhexyl, and mixtures thereof.

In one or more embodiments, the polyacrylate elastomers that are useful as adhesives in the practice of this invention may be characterized by a number average molecular weight of from about 100 to about 350 kg/mole, in other embodiments from about 150 to about 270 kg/mole, and in other embodiments from about 180 to about 250 kg/mole.

In one or more embodiments, the polyacrylate elastomers that are useful as adhesives in the practice of this invention may be characterized by a glass transition temperature (Tg) of less than 0° C., in other embodiments less than −20° C., in other embodiments less than −30° C. In these or other embodiments, useful polyacrylates may be characterized by a Tg of from about −70 to about 0° C., in other embodiments from about −50 to about −10° C., and in other embodiments from about −40 to about −20° C.

In one or more embodiments, the polyacrylate elastomers that are useful as adhesives in the practice of this invention may be characterized by a Brookfield viscosity at 150° C. of from about 20,000 to about 70,000 cps, in other embodiments from about 30,000 to about 60,000 cps, and in other embodiments from about 40,000 to about 50,000 cps.

Specific examples of polyacrylate elastomers that are useful as adhesives in the practice of the present invention include poly(butylacrylate), and poly(2-ethylhexylacryalte). These polyacrylate elastomers may be formulated with photoinitiators, solvents, plasticizers, and resins such as natural and hydrocarbon resins. The skilled person can readily formulate a desirable coating composition. Useful coating compositions are disclosed, for example, in U.S. Pat. Nos. 6,720,399; 6,753,079; 6,831,114; 6,881,442; and 6,887,917, which are incorporated herein by reference.

In other embodiments, the polyacrylate elastomers may include polymerized units that serve as photoinitiators. These units may derive from copolymerizable photoinitiators including acetophenone or benzophenone derivatives. These polyacrylate elastomers and the coating compositions formed therefrom are known as disclosed in U.S. Pat. Nos. 7,304,119 and 7,358,319, which are incorporated herein by reference.

Useful adhesive compositions are commercially available in the art. For example, useful adhesives include those available under the tradename acResin (BASF), those available under the tradename AroCure (Ashland Chemical), and NovaMeltRC (NovaMelt). In one or more embodiments, these hot-melt adhesives may be cured (i.e., crosslinked) by UV light.

In one or more embodiments, the hot-melt adhesive is at least partially cured after being applied to the membrane, as will be discussed in greater detail below. In one or more embodiments, the adhesive is cured to an extent that it is not thermally processable in the form it was prior to cure. In these or other embodiments, a cross-linked infinite polymer network characterizes the cured adhesive. While at least partially cured, the adhesive layer of one or more embodiments is essentially free of curative residue such as sulfur or sulfur crosslinks and/or phenolic compounds or phenolic-residue crosslinks.

Characteristics of Pressure-Sensitive Adhesive Layer

In one or more embodiments, the degree of cure throughout the pressure-sensitive adhesive layer has a substantially consistent degree of cure. In one or more embodiments, the degree of cure throughout the entire adhesive layer varies by no more than 10%, in other embodiments by no more than 5%, and in other embodiments by no more than 1%. In one or more embodiments, the degree of cure is substantially consistent, which refers to an unappreciable variation in the cure state. In one or more embodiments, the cure state of the entire adhesive layer can be quantified based upon gel content. As a skilled person appreciates, gel content can be determined based upon the level of insoluble material following solvent extraction, which for purposes of this specification refers to solvent extraction using THF at its boiling point following four hours of extraction. These extraction techniques can be performed, for example, using Soxhlet extraction devices. In one or more embodiments, the gel content of the cured adhesive layer, based upon a THF extraction at the boiling point of THF after four hours, is at least 50%, in other embodiments at least 55%, and in other embodiments at least 60% by weight. In these or other embodiments, the gel content is less than 90%, in other embodiments less than 85%, and in other embodiments less than 80%. In one or more embodiments, the gel content is from about 50% to about 90%, in other embodiments from about 55% to about 85%, and in other embodiments from about 60% to about 80% by weight.

In one or more embodiments, the pressure-sensitive layer (i.e., the crosslinked pressure-sensitive adhesive) disposed on a surface of the membrane may be characterized by advantageous strength, which can be quantified based upon the peel strength of adhered system formed using the pressure-sensitive layer. In one or more embodiments, the adhesive layer may give rise to a peel strength when adhered to facer material, according to Pressure Sensitive Tape Council (PSTC) 101, of at least 3.0, in other embodiments at least 3.5, and in other embodiments at least 4.0 units. In these or other embodiments, the peel strength may be from about 3.0 to about 25 in other embodiments from about 3.5 to about 20, and in other embodiments from about 4.0 to about 18 psi.

As indicated above, the pressure-sensitive adhesive, in its cured or partially cured state, provides sufficient tack to allow the membrane composites of this invention to be used in roofing systems that meet industry standards for wind uplift resistance. In one or more embodiments, this tack may be quantified based upon the peel strength when adhered to another membrane in accordance with ASTM D-1876-08. In one or more embodiments, the cured pressure-sensitive adhesive of the present invention is characterized by a peel strength, according to ASTM D-1876-08, of at least 1.8 lbf/in, in other embodiments at least 3.6 lbf/in, in other embodiments at least 8.0 lbf/in, in other embodiments at least 15 lbf/in, and in other embodiments at least 20 lbf/in.

Similarly, the tack of the pressure-sensitive adhesive, in its cured state, may be quantified based upon the peel strength when adhered to a construction board (e.g. insulation board) having a kraft paper facer in accordance with ASTM D-903-98 (2010). In one or more embodiments, the cured pressure-sensitive adhesive of the present invention is characterized by a peel strength, according to ASTM D-903-98 (2010) using an insulation board with a kraft paper facer, of at least 1.5 lbf/in, in other embodiments at least 2.0 lbf/in, in other embodiments at least 2.5 lbf/in, in other embodiments at least 3.0 lbf/in, and in other embodiments at least 3.5 lbf/in.

In one or more embodiments, the pressure-sensitive adhesive layer may be characterized by an advantageous dead load shear. In one or more embodiments, the dead load shear of the layer of crosslinked pressure-sensitive adhesive disposed on the membranes of the present invention may be characterized by a dead load shear, as determined according to PSTC 107, of at least 0.5 hour (time of failure), in other embodiments at least 1.0 hour, and in other embodiments at least 1.5. In these or other embodiments, the dead load shear may be from about 2.0 to about 2.5 hours.

PRIMER LAYER

In one or more embodiments, the primer (e.g. layer 23) derives from a primer composition. In other words, and as will be described in greater detail below, a primer composition is applied to a surface of the membrane (e.g. in the lap area), such as in the form of a solvent-borne composition, to thereby form a wet coating layer, and then the wet coating layer is provided adequate time (optionally under conditions of heat and/or reduced pressure) to flash of or otherwise allow the solvent to evaporate and thereby leave the primer layer remaining. As will be described in greater detail below, the primer composition includes solids, such as polymeric materials, and the primer layer therefore includes the solids (i.e. non-volatile) portion or residue of the primer composition.

In one or more embodiment, the primer may include, but is not limited to, polyvinylacrylates, polyvinylmethacrylates, polyisoprene, polyisobutylenes, polystyrene-methacrylate copolymer, polystyrene-acrylate copolymer, polyvinylchloride, polyvinylidenechloride, polyvinylidenedichloride-ethylene copolymer, polyvinylchloride-ethylene copolymer, polyvinylacetate, polyvinylacetate-ethylene copolymer, polystyrene, polystyrene-ethylene copolymer, polystyrene-isoprene copolymer, polystyrene-butylene copolymer, and polystyrene-butadiene copolymer.

In particular embodiments, the primer includes a copolymer of esters of methacrylic acid and/or acrylic acid. The esters can be chosen to optimize the Tg of the primer coating, so as to prevent the primer coating from sticking to the membrane during the windup operation. The ester or esters may also be chosen so as to allow the primed membrane surface to bond with a pressure-sensitive adhesive layer of an adjacent membrane with a low level of force, such as the force that would typically be applied by using an 18-24" broom.

Practice of the present invention is not necessarily limited by the selection of the solvent within the primer composition. Suitable non-limiting examples of solvents include toluene, hexane, xylene, heptane, methanol and ethanol. Other solvents may include parachlorobenzotrifluoride, 1-dodecene, toluene, hexane, heptane, methylene chloride, 1,1,1-trichlorethane, xylene, 1-tetradecene, chloroform, and tetrachloro ethylene. Blends of solvents may be employed. An exemplary solvent blend includes acetone and t-butyl acetate.

In one embodiment, the primer composition may include greater than 30, in other embodiments greater than 50, in other embodiments greater than 60, and in other embodiments greater than 70 vol % solvent, with the balance including solids. In these or other embodiments, the primer composition may include less than 95, in other embodiments less than 90, and in other embodiments less than 85 vol % solvent, with the balance including solids. In one or more embodiments, the primer composition includes from about 30 to about 99, in other embodiments from about 50 to about 90, and in other embodiments from about 60 to about 85 vol % solvent, with the balance including solids.

Useful primer compositions are known in the art such as, but not limited to, Firestone QuickPrime Plus, Firestone QuickPrime Plus LVOC, ADCO HSSP-1, and Ashland PLIOSEAL™ 9705.

In other embodiments, the primer layer (e.g. layer 23) derives from the application of a hot melt adhesive.

Characteristics of Primer Layer

In one or more embodiments, the primer layer lacks adhesive qualities as compared to the pressure-sensitive adhesive layer (e.g. layer 19). For example, a lap seam formed with just two primed surfaces and no tape may be characterized by a peel strength of less than 1.0 pli (1.75 N/cm). A lap seam including primed surfaces and adhesive tape may be characterized by a peel strength of at least 1.8 pli (3.15 N/cm). In other embodiments the peel strength of the taped lap seam may be at least 2 pli (3.5 N/cm). In still other embodiments the peel strength of the taped lap seam may be at least 2.2 pli (3.85 N/cm). As is known in the art, peel strength can be determined by ASTM D413.

In one or more embodiments, the primer layer lacks significant tack. In one or more embodiments, the primer is tack free in its cured state.

Release Member

In one or more embodiments, release member 21 and optional release member 27 may include a polymeric film or extrudate, or in other embodiments it may include a cellulosic substrate. Where the polymeric film and/or cellulosic substrate cannot be readily removed after being attached to the asphaltic component, the polymeric film and/or cellulosic substrate can carry a coating or layer that allows the polymeric film and/or cellulosic substrate to be readily removed from the asphaltic component after attachment. This polymeric film or extrudate may include a single polymeric layer or may include two or more polymeric layers laminated or coextruded to one another.

Suitable materials for forming a release member that is a polymeric film or extrudate include polypropylene, polyester, high-density polyethylene, medium-density polyethylene, low-density polyethylene, polystyrene or high-impact polystyrene. The coating or layer applied to the film and/or cellulosic substrate may include a silicon-containing or fluorine-containing coating. For example, a silicone oil or polysiloxane may be applied as a coating. In other embodiments, hydrocarbon waxes may be applied as a coating. As the skilled person will appreciate, the coating, which may be referred to as a release coating, can be applied to both planar surfaces of the film and/or cellulosic substrate. In other embodiments, the release coating need only be applied to the planar surface of the film and/or cellulosic substrate that is ultimately removably mated with the asphaltic component.

In one or more embodiments, release member 21 and optional release member 27 are characterized by a thickness of from about 15 to about 80, in other embodiments from about 18 to about 75, and in other embodiments from about 20 to about 50 µm.

Preparation of Membrane Composite

As indicated above, the membrane composite panels employed in the practice of this invention are advantageously prepared in a factory setting, which thereby maximizes efficiency of manufacture and installation, as well as reduces VOCs during installation. While one or more manufacturing facilities may be employed in the manufacture of the composite, the membrane composite is fabricated before delivery to the location where the membrane composite is installed.

In one or more embodiments, the manufacture of the membrane composite takes place by providing a polymer membrane panel, applying a pressure-sensitive adhesive to a surface of the panel, applying a primer composition to a surface of the panel opposite the surface where the adhesive is applied, applying a release liner over the pressure-sensitive adhesive, optionally applying a release liner over the primer layer, winding the membrane composite, and transporting the membrane composite to a location where the membrane composite will be installed.

In one or more embodiments, the membrane panel may be provided by employing conventional techniques. For example, thermoplastic membrane panels may be formed by the extrusion of thermoplastic compositions into one or more layers that can be laminated into a membrane panel. Thermoset membranes can be formed using known calendering and curing techniques. Alternatively, thermoset membranes can be made by continuous process such as those disclosed in WO 2013/142562, which is incorporated herein by reference.

Once the membrane panel is provided, a curable hot-melt adhesive composition is applied to a planar surface of the panel. The application and curing of curable hot-melt adhesive compositions onto a roofing membrane are known as described in U.S. Publ. Nos. 2016/0230392; 2017/0114543; 2018/0257310; and 2017/0015083, which are incorporated herein by reference.

As is known in the art, the hot-melt adhesive composition can be extruded and applied to the membrane by extrusion techniques that employ known apparatus such as adhesive coaters. The adhesive composition can then subsequently be cured, or partially cured, by using, for example, UV radiation. The release film can then be applied to the adhesive layer and removably mated thereto by using, for example, squeeze rollers.

Application of the primer can take place before, after, or simultaneous with the pressure-sensitive adhesive layer. As suggested above, in one or more embodiments, the primer is applied in the lap area or region of the membrane on a surface opposite the surface on which the pressure-sensitive adhesive is or will be applied. Methods for providing a membrane with a factory-applied primer are generally known in the art as described in U.S. Publ. Nos. 2007/0264471; 2010/0024955; 2011/0198023; 2010/0200148; and 2013/0295295, which are incorporated herein by reference.

In one or more embodiments, the primer composition is applied using conventional techniques relative to the nature of the primer composition. For example, solvent-borne compositions can be applied by roll, slot die, spray, metering rod, or extrusion coating techniques. If a solvent based application is used, the composition is given time to dry (i.e. the solvent is evaporated). Where the primer composition is cured, one or more steps are conducted to cure the primer composition. For example, the primer composition, after application to the membrane panel, may be subjected to heat or other forms of energy (such as UV energy) to cause a crosslinking of one or more of the crosslinkable polymers within the primer coating.

Following application of the primer composition and, if required, an evaporation of the solvent or a curing step, a release film 27 can optionally be removably mated to the primer layer.

Advantageously, where the membrane panel is made by using continuous techniques, the process can be supplemented with continuous techniques for applying and curing the adhesive coatings and primer compositions according to embodiments of the present invention to thereby prepare usable membrane composites within a single continuous process.

Once the adhesive layer and the primer layer are applied to the membrane panel, as well as one or more of the respective release members, the membrane panel is cut to length and rolled on itself for subsequent storage and shipment to the installation site. As a result, the step of providing the membrane composite may include providing a rolled membrane composite to the location where the membrane composite will be installed. As the skilled person will appreciate, in order to place the membrane composite into position for installation, the membrane composite is unrolled.

Installation of Roof System

According to aspects of the invention, adjacent roofing panels of a roof system can be installed on a roof surface (also known as roof substrate) by using standard peel-and-stick techniques, including adhesive seaming with a pre-applied pressure-sensitive adhesive, without the need to field prime the lateral edge of the roofing membrane. Those skilled in the art appreciate that peel-and-stick refers to techniques whereby a protective membrane, such as a release member, which is removably mated to a surface, is removed to expose the surface, and the exposed surface is then mated to a second surface.

For example, according to aspects of the invention, a membrane can be unrolled on a roof surface and placed into position. Portions of the membrane are then typically folded back and portions of the release member that are removably mated to the pressure-sensitive adhesive layer are removed. The membrane can then subsequently be mated to the roof surface through the adhesive layer by using various techniques including the use of rollers and the like to mate the adhesive to the substrate. After securing this first membrane to the roof substrate, a second membrane is positioned adjacent to this first membrane with a portion of the second membrane overlapping the first membrane to form a lap. The second membrane also carries an adhesive layer on its bottom surface (i.e. roof contacting surface), and this adhesive, through standard peel-and-stick techniques, is used to secure the second membrane to the roof substrate. Additionally, the adhesive layer of the second membrane is used to mate the second membrane to the first membrane in the lap area. Again, this may include peel-and-stick techniques whereby a release member is removed from the adhesive on the second membrane in the lap region. Optionally, a release member is removed from the lap area on the top of the first membrane to expose the primer layer. The lap area is seamed by mating the adhesive layer on the second membrane to the primer layer on the first membrane. The skilled person appreciates that these methods can be performed in multiple sequences. For example, the seam can be formed between the first and second membranes prior to securing the membranes to the roof substrate. Or, the first membrane secured to the substrate can be positioned in an overlapping fashion to an adjacent membrane that is subsequently set in place. In other words, those performing the installation can, as a matter of preference, elect which of the adjacent membranes form the overlapping portion of the lap.

Figure 2:
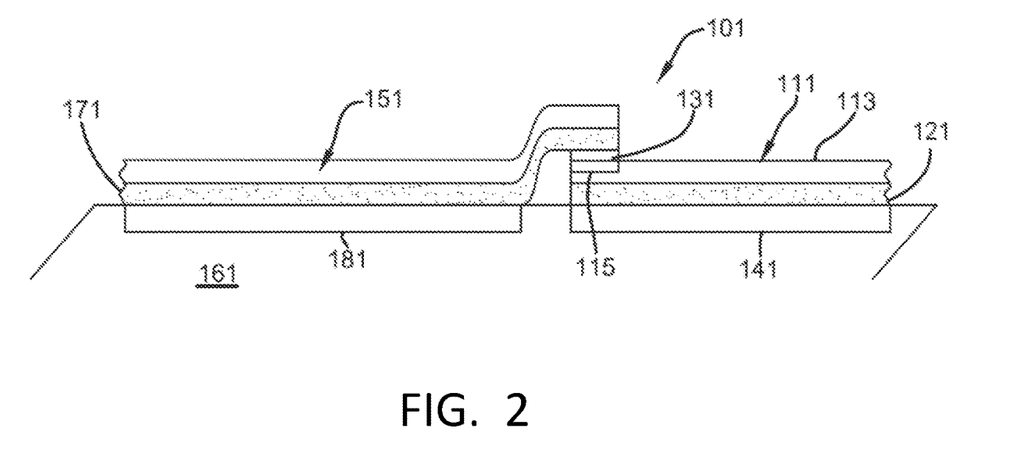
FIG. 2 is a cross-sectional side view of a roof system prepared according to aspects of the present invention.

Methods for installing a roof system and the resulting roof system can be described with reference to FIG. 2, which shows roof system 101 including first membrane composite 111 and second membrane composite 151, which are both adhesively secured to roof substrate 161. Specifically, membrane composite 111 is adhesively secured to substrate 161 through pressure-sensitive adhesive layer 121 along a roof-surface contacting region 141. And, membrane composite 151 is secured to roof substrate 161 through pressure-sensitive adhesive layer 171 along a roof-substrate contacting region 181. Additionally, adhesive layer 171 of composite membrane 151 is adhesively mated to the primer layer 131 along the lap seam area 115.

In one or more embodiments, roof system 101 is installed by first providing membrane composite 111, which includes membrane 113, adhesive layer 121, and primer layer 131. Adhesive layer 121 is disposed on a bottom or roof-contacting surface of membrane 113. Primer layer 131 is disposed on an opposite surface of membrane 113 in a lap area 115. Prior to installation, membrane composite 111 may include a release member removably attached to adhesive layer 121 opposite membrane 113. Also, a release member may optionally be removably attached to primer layer 131 on a surface thereof opposite membrane 113. During installation, the release member is removed from the pressure sensitive adhesive layer 121 and membrane composite 111 is adhesively secured to the roof substrate 161.

A second membrane composite 151 is provided. The second membrane composite 151 includes a pressure sensitive adhesive layer 171 on a second planar surface of the membrane and a release member removably affixed to the pressure sensitive adhesive layer 171. The second membrane composite 151 also optionally includes a pre-applied primer layer on a lap seam area of its first planar surface wherein the pre-applied primer layer also optionally includes a release liner removably affixed to the pre-applied primer layer.

Second membrane composite 151 is positioned adjacent to first membrane composite 111 so as to overlap the lap area 115. A release member is removed from pressure sensitive adhesive layer 171, and membrane composite 151 is adhesively secured to roof substrate. Then, second membrane composite 151 is seamed to first membrane composite 111 by mating adhesive layer 171 of composite 151 to primer layer 131 of first composite 111, which thereby splices the two membranes to each other. As suggested above, this step may require removing a release member from adhesive layer 171 within the overlapping seam area, and may also require removing a release member from primer layer 131 of composite 111. The mating of composite 151 to composite 111 within the lap area may be facilitated by the use of rollers and the like to apply force to composite 151 in the lap area.

Following this seaming step, a lap sealant may optionally be applied in the location where membrane composite 151 terminates in an overlapping manner on composite 111.

Various modifications and alterations that do not depart from the scope and spirit of this invention will become apparent to those skilled in the art. This invention is not to be duly limited to the illustrative embodiments set forth herein.

What is claimed is:

1. A method of installing a roof system, the method comprising:
    (i) providing a first membrane composite including a polymeric planar body having first and second planar surfaces, where the polymeric planar body is a cured rubber membrane, a UV-cured pressure-sensitive adhesive layer disposed on the second planar surface, where the UV-cured pressure-sensitive adhesive layer includes a UV-cured acrylic resin, a release member removably secured to the pressure-sensitive adhesive layer opposite the polymeric planar body, and a pre-applied primer layer disposed along a lap area on the first planar surface;
    (ii) adhesively securing the first membrane composite to a roof surface through the UV-cured pressure-sensitive adhesive layer;
    (iii) providing a second membrane composite including a polymeric planar body having first and second planar surfaces, where the polymeric planar body is a cured rubber membrane, a UV-cured pressure-sensitive adhesive layer disposed on the second planar surface, where the UV-cured pressure-sensitive adhesive layer includes a UV-cured acrylic resin, a release member removably secured to the pressure-sensitive adhesive layer opposite the planar body; and including a second pre-applied primer layer disposed along a lap area on the first planar surface;
    (iv) adhesively securing the second membrane composite to the roof surface through the UV-cured pressure-sensitive adhesive layer, where the second membrane composite is positioned adjacent to and partially overlapping the lap area of the first membrane composite; and
    (v) adhesively securing the second membrane composite to the first planar surface of the first membrane composite along the pre-applied primer layer through the UV-cured pressure-sensitive adhesive layer disposed on the second membrane composite.

2. The method of claim 1, further comprising removing a release member that is removably secured to the pre-applied primer layer.

3. The method of claim 1, wherein the lap area extends along a lateral edge of the polymeric planar body.

4. The method of claim 1, wherein the pre-applied primer layer includes derives from a primer composition including polyvinylacrylates, polyvinylmethacrylates, polyisoprene, polyisobutylenes, polystyrene-methacrylate copolymer, polystyrene-acrylate copolymer, polyvinylchloride, polyvinylidenedichloride, polyvinylidenedichloride-ethylene copolymer, polyvinylchloride-ethylene copolymer, polyvinylacetate, polyvinylacetate-ethylene copolymer, polystyrene, polystyrene-ethylene copolymer, polystyrene-isoprene copolymer, polystyrene-butylene copolymer, or polystyrene-butadiene copolymer.

5. The method of claim 1, wherein the pre-applied primer layer includes a copolymer of esters of methacrylic acid and acrylic acid or combinations thereof.

6. The method of claim 1, wherein the pre-applied primer layer derives from a solvent-based primer composition, and wherein the solvent-based primer composition includes from 2 to 25 weight percent of a solvent selected from the group consisting of acetone, butyl acetate, and combinations thereof.

7. The method of claim 1, where the UV-cured pressure-sensitive adhesive layer has a thickness of from about 102 to about 381 μm and a Tg of less than 0° C.

8. The method of claim 1, where the UV-cured pressure-sensitive adhesive includes one or more units deriving from butyl acrylate or 2-ethylhexyl acrylate.

9. The method of claim 1, where said step of providing the second membrane composite includes providing the second membrane composite in the form of a roll, and where the process further includes unrolling the second membrane composite.

* * * * *